(12) United States Patent
Pik et al.

(10) Patent No.: US 7,681,202 B2
(45) Date of Patent: Mar. 16, 2010

(54) PORTAL RUNTIME FRAMEWORK

(75) Inventors: Yossi Pik, Tel Aviv (IL); Tsufit Naor, Kfar Saba (IL); Ofer Feldman, Hertzelia (IL); Ariel Bentolila, Ramat Hasharon (IL)

(73) Assignee: SAP Portals Israel Ltd., Ra'anana (IL)

( * ) Notice: Subject to any disclaimer, the term of this patent is extended or adjusted under 35 U.S.C. 154(b) by 1655 days.

(21) Appl. No.: 10/853,024

(22) Filed: May 21, 2004

(65) Prior Publication Data

US 2006/0041890 A1 Feb. 23, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................... 719/315
(58) Field of Classification Search ................. 719/315, 719/316, 320
See application file for complete search history.

(56) References Cited

U.S. PATENT DOCUMENTS

| 6,349,343 | B1 | 2/2002 | Foody et al. | |
|---|---|---|---|---|
| 7,130,891 | B2 * | 10/2006 | Bernardin et al. | 709/218 |
| 2001/0009016 | A1 * | 7/2001 | Hofmann et al. | 709/219 |
| 2001/0047387 | A1 * | 11/2001 | Brockhurst | 709/203 |
| 2002/0133598 | A1 * | 9/2002 | Strahm et al. | 709/228 |
| 2003/0088550 | A1 * | 5/2003 | Menashe | 707/3 |
| 2003/0105883 | A1 * | 6/2003 | Gibbons | 709/313 |
| 2003/0237044 | A1 | 12/2003 | Hayer et al. | |
| 2004/0002944 | A1 | 1/2004 | Hauser et al. | |
| 2004/0003097 | A1 | 1/2004 | Willis et al. | |
| 2004/0010598 | A1 | 1/2004 | Bales et al. | |
| 2004/0015564 | A1 * | 1/2004 | Williams | 709/219 |
| 2004/0030627 | A1 * | 2/2004 | Sedukhin | 705/36 |
| 2004/0046789 | A1 | 3/2004 | Inanoria | |
| 2004/0049776 | A1 | 3/2004 | Fomenko et al. | |
| 2004/0054749 | A1 * | 3/2004 | Doyle et al. | 709/217 |
| 2004/0117435 | A1 * | 6/2004 | Rossmanith et al. | 709/202 |
| 2005/0262480 | A1 | 11/2005 | Pik et al. | |

(Continued)

FOREIGN PATENT DOCUMENTS

WO WO 2005/114388 A1 12/2005

(Continued)

OTHER PUBLICATIONS

U.S. Appl. No. 10/851,462, filed May 21, 2004, Pik et al.

(Continued)

*Primary Examiner*—Andy Ho
*Assistant Examiner*—KimbleAnn Verdi
(74) *Attorney, Agent, or Firm*—Buckley, Maschoff & Talwalkar LLC

(57) ABSTRACT

Techniques that enable an application or component developed according to a first framework specification to use services provided by an application executing on a second framework that is different from the first framework. A portal architecture is described that is capable of running portal snippets developed according to different framework specifications. A J2EE framework-based portal is configured to execute portal snippets developed using Java for a Java-based framework and also to provide support for and execute portal snippets that have been developed using a language supported by another framework such as .NET framework.

21 Claims, 5 Drawing Sheets

U.S. PATENT DOCUMENTS

2007/0005777 A1* 1/2007 Fremantle et al. .......... 709/228

FOREIGN PATENT DOCUMENTS

WO    WO 2005/114389 A1    12/2005

OTHER PUBLICATIONS

U.S. Appl. No. 10/851,469, filed May 21, 2004, Feldman.
"Achieving Interoperability: ILOG JRules, .NET and JNBridgePro," pp. 1-9.
"ASP.NET, Demonstrating Attributes and Reflection in .NET," contributed by Wrox Team, pp. 1-22 downloaded from http://www.devarticles.com/index2.php?option=content&task=view&id=362&pop=1&hi... on Nov. 17, 2004.
Cherng et al., "Contact First Web Services Interoperability between Microsoft .Net and IBM WebSphere," pp. 1-27 downloaded from http://msdn.microsoft.com/vstudio/java/interop/websphereinterop/default.aspx?print=true on Jan. 20, 2006.
Guest, S., "Web Services Interoperability Guidance (WSIG): IBM WebSphere Application Developer 5.1.2," pp. 1-16 downloaded from http://msdn.microsoft.com/vstudio/java/interop/strategies/default.aspx?pull=/library on Jan. 20, 2006.
Guest, S., "Web Services Interoperability Guidance (WSIG): BEA WebLogic 8.1 SP3 (8.1.3)," pp. 1-10 downloaded from http://msdn.microsoft.com/vstudio/java/interop/strategies/default.aspx?pull=/library/en-us/.. on Jan. 20, 2006.
Herman, M., "Microsoft SharePoint Products and Technologies: Technical Overview," pp. 1-12 downloaded from http://www.microsoft.com/technet/prodtechnol/office/sps2003/plan/spst23to.mspx?pf=true on Nov. 23, 2004, updated Aug. 19, 2003.
"Implementing Rich Collaboration Infrastructure Using Microsoft Windows SharePoint Services and Microsoft Office SharePoint Portal Server 2003," White Paper (2003).
International Search Report and Written Opinion for corresponding PCT application # PCT/EP2005/003530, Aug. 11, 2005.
International Search Report and Written Opinion for PCT application # PCT/EP2005/003528, Jul. 11, 2005.
"Interoperability between Java and Microsoft, Understanding the problems and solutions when integrating heterogeneous distributed computing environments," Whitepaper by Intrinsyc Software, pp. 1-14 (2005).
Intrinsyc Software Product Brochures and other materials downloaded from http:www.intrinsyc.com on Jan. 20, 2006.
"Introducing Visual Studio," web pages downloaded from http://msdn2.microsoft.com/library(d=printer)/fx6bklf4.aspx on Jan. 20, 2006.
"Java/.NET Interoperability: A detailed Comparison of Options," A JNBridge White Paper, pp. 1-7 downloaded from http://www.jnbridge.com/cgi-bin/downloads.pl?itemID=4&view=2 on Oct. 18, 2005, paper date Apr. 5, 2004.
"JNBridgePro™: A Technical Overview," White Paper, pp. 1-6 (2002-2005).
Preradovic, M., "Whitepaper: Microsoft .NET to J2EE Interoperability Performance Analysis," pp. 1-12 (2005).
"SAP Exchange Infrastructure: process-centric collaboration," SAP White Paper, version 1.2, pp. 1-36 downloaded from http://www.isaca.be/Presentations/RT020928%0Exchange_White.pdf on Oct. 18, 2005, (2002).
"SAP Netweaver Platform Interoperability with IBM Websphere and Microsoft.NET," SAP White Paper, pp. 1-16 downloaded from http://www.sap.com/solutions/netweaver/pdf/BWP_Interoperability.pdf on Oct. 18, 2005, (2003).
"SAP® Enterprise Portal, Portal Infrastructure," pp. 1-16 (2003).
"SAP® Enterprise Portal—Portal Content," pp. 1-22 (2003).
"SharePoint Portal Server Deployment Resources," pp. 1-5 downloaded from http://office.microsoft.com/en-us/FX011442341033.aspx on Nov. 23, 2004.
"SharePoint Portal Server 2003 Product," pp. 1-2 downloaded from http://office.microsoft.com/office/sharepoint/prodinfo/default.mspx on Nov. 23, 2004.
"SharePoint Portal Server," pp. 1-2 downloaded from http://office.microsoft.com/en-us/FX010909721033.aspx on Nov. 23, 2004.
"Strategies for Interoperability," pp. 1-3 downloaded from http://msdn.microsoft.com/vstudio/java/interop/strategies/default.aspx on Jan. 20, 2006.
"Technical Note: JNBridgePro and Clustering," pp. 1-4 (2004).
Watts, M., "Solving the Enterprise Application Integration Challenge," brochure by Intrinsyc Software (2004).

* cited by examiner

J2EE Cluster    .NET Cluster

PORTAL RUNTIME FRAMEWORK

CROSS-REFERENCES TO RELATED APPLICATIONS

The present application incorporates herein by reference for all purposes the entire contents of the following applications:

(1) U.S. Non-Provisional patent application Ser. No. 10/851,696 entitled "TECHNIQUES FOR DEVELOPING PORTAL SNIPPETS USING AN INTEGRATED DEVELOPMENT ENVIRONMENT (IDE)" filed concurrently with the present application;

(2) U.S. Non-Provisional patent application Ser. No. 10/851,462 entitled "DISPLAYING PORTALS INFORMATION" filed concurrently with the present application; and (3) U.S. Non-Provisional patent application Ser. No. 10/851,469 entitled "TECHNIQUES FOR ACCESSING PORTAL COMPONENTS" filed concurrently with the present application.

BACKGROUND OF THE INVENTION

The present invention relates to providing runtime support for applications developed for different frameworks, and more specifically to techniques for providing a portal that is capable of executing portal components developed based upon different frameworks and languages.

Various computing frameworks or platforms have evolved over the years in the computer industry. Examples of such computing frameworks include the .NET computing framework from Microsoft Corporation, Java-based frameworks such as the Java 2 Platform, Enterprise Edition (J2EE) framework from Sun Microsystems, Inc., and others. Each framework can be considered a group (sometime called a "stack") of common services that each framework provides to applications that are built with or run on the framework.

The .NET framework is a framework provided by Microsoft for programming support for web services that provide a user the ability to use the Web rather than the user's computer for various services. .NET provides users with a Web-enabled interface for applications and computing devices and makes computing activities increasingly Web browser-oriented. The .NET framework includes servers; building-block services, such as Web-based data storage, and device software. The .NET framework also enables developers to create reusable modules that can be used in the .NET framework. Common Language Runtime (CLR) provides a foundation for building applications and components for the .NET framework.

J2EE is a Java-based application server framework from Sun Microsystems, Inc. for the development of distributed applications. J2EE and is designed for simplifying application development in a multi-tiered environment by enabling users to create standardized, reusable modular components. J2EE includes many components of the Java 2 Framework, Standard Edition (J2SE). The J2EE framework consists of a set of services, application programming interfaces (APIs), and protocols that provide the functionality for developing multi-tiered, Web-based applications.

Each framework generally supports its own set of programming languages, design environments, programming conventions, programming methodologies, programming APIs, messaging services, security services, etc. that may be used to build applications for the specific framework. For example, the Java language is used to build applications for the J2EE framework. A Java Development Kit (JDK) is provided for building applications for the J2EE framework. On the other hand, languages that can be used to build applications for the .NET framework include C++, C#, Visual Basic .NET, J#, ASP.NET, etc (referred to as the ".NET languages").

The runtime environment that is needed to support and execute applications written for a particular framework also differs from the runtime environment for other frameworks. For example, a Java stack or Java Virtual Machine (JVM) running on a UNIX machine is generally needed for running applications that are built for the J2EE framework. An Internet Information Services (IIS) Server running on a Microsoft Windows machine and CLR compilers are generally needed for running applications developed for the .NET framework.

Due to the potential differences in programming languages, design environments, and runtime environments associated with various disparate frameworks, it is usually difficult for applications written for one framework to interface with applications running on another framework that is not compatible with the first framework. As a result, when a particular application is to be developed, developers generally adopt a specific framework and build applications and services for the adopted framework.

For example, enterprise portal products developed by SAP AG are based upon a Java framework such as J2EE framework. As a result, a SAP Portal supports components (e.g., portal snippets or iViews) developed in a J2EE environments using Java. Such components are commonly referred to as Java components. Components developed for a .NET framework (".NET components") using a .NET language cannot be properly integrated to use services provided by the SAP Java-based portal. This has proven to be a major impediment for .NET developers to write components for SAP portals. While several "hacks" have been developed in the past to enable .NET components to be somewhat "functional" in a SAP J2EE Portal environment, the extent of the functionality is very limited, rudimentary, inefficient, and achieves poor performance. For example, a separate IIS server is needed to handle .NET requests from the .NET component, further complicating the overall portal.

In light of the above, techniques are desired that provide support for runtime execution of applications and components developed for different frameworks.

BRIEF SUMMARY OF THE INVENTION

Embodiments of the present invention provide techniques that enable an application or component developed according to a first framework specification to use services provided by an application executing on a second framework that is different from the first framework. A portal architecture is described that is capable of running portal snippets developed according to different framework specifications. A J2EE framework-based portal is configured to execute portal snippets developed using Java for a Java-based framework and also to provide support for and execute portal snippets that have been developed using a language supported by (or compatible with) another framework such as .NET framework.

According to an embodiment of the present invention, techniques are provided fro providing portal services. A first portal server executing according to a first framework receives a request from a first computer identifying a portal snippet that is developed using a first language supported by a second framework different from the first framework. The request is communicated from the first portal server to a second portal server that is configured to process portal snippets configured using a language supported by the second framework. A response to the request is generated at the second portal server and communicated from the second portal server to the first portal server. The response is communicated from the first portal server to the first computer.

According to another embodiment of the present invention, techniques are provided for providing portal functionality. A first portal server is provided that is configured to process portal snippets developed using a first language supported by a first framework. A second portal server is provided that is configured to process portal snippets developed using a second language supported by a second framework. The first portal server receives a request from a first computer identifying a portal snippet that is developed using the second language. The request is communicated from the first portal server to the second portal server. A response to the request is generated at the second portal server. The response is communicated to the first computer via the first portal server.

The foregoing, together with other features, embodiments, and advantages of the present invention, will become more apparent when referring to the following specification, claims, and accompanying drawings.

DETAILED DESCRIPTION OF THE INVENTION

Figure 1:
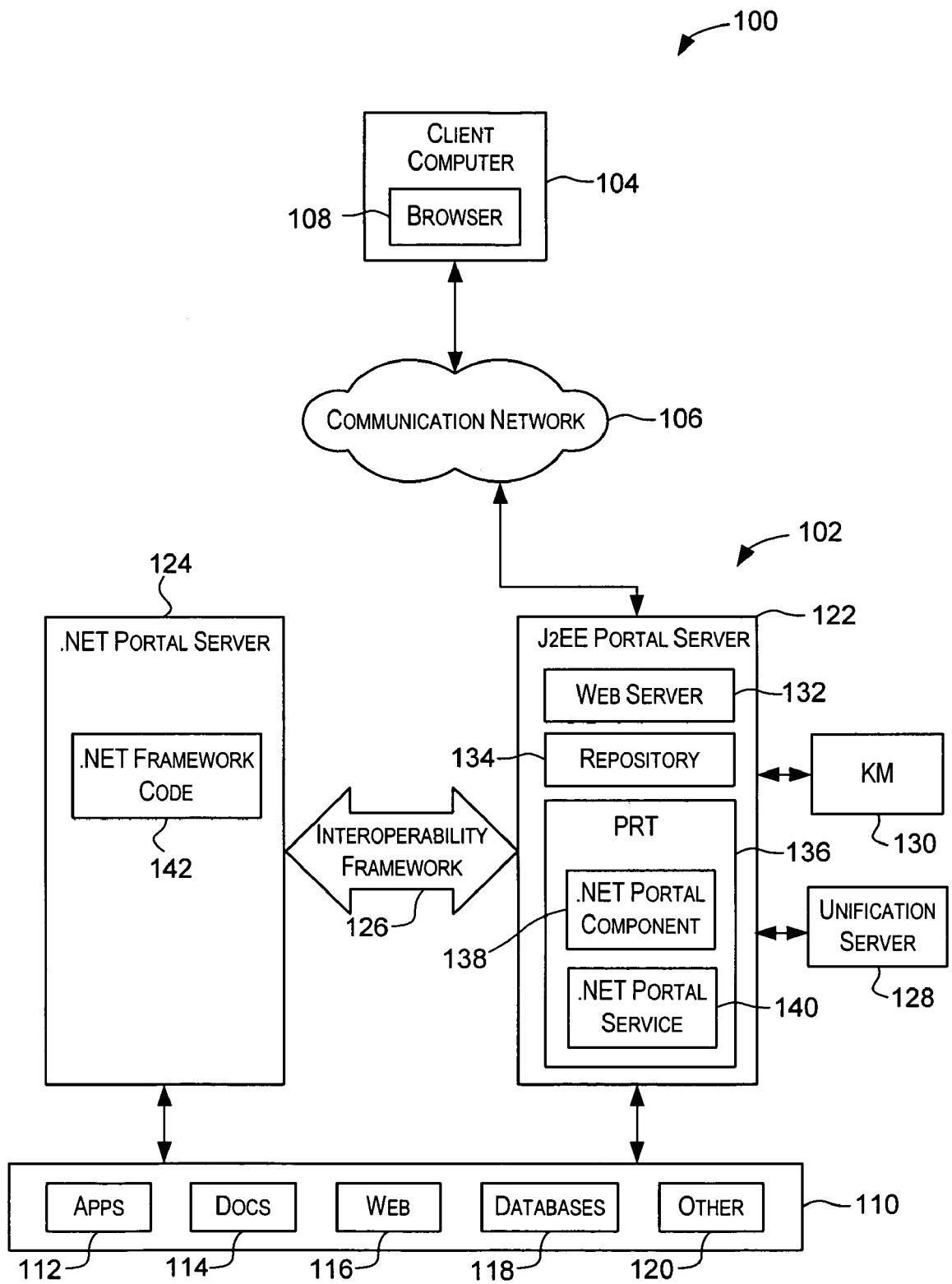
FIG. 1 is a simplified block diagram of a distributed network comprising an enterprise portal that may incorporate an embodiment of the present invention.

In the following description, for the purposes of explanation, specific details are set forth in order to provide a thorough understanding of the invention. However, it will be apparent that the invention may be practiced without these specific details.

Embodiments of the present invention provide techniques that enable an application or component developed according to a first framework specification to execute and use services provided by an application executing on a second framework that is different from the first framework. According to an embodiment of the present invention, a portal architecture is described that is capable of running portal snippets developed according to different framework specifications. In the embodiment described below, a SAP portal environment is described that executes in a Java-based J2EE environment. In addition to executing portal snippets developed using Java for a Java-based framework, the SAP portal also provides support for and executes portal snippets that have been developed using a language supported by another framework such as .NET framework The teachings of the present invention are however not limited to the J2EE or .NET framework but can be applied to other frameworks.

A portal provides a central gateway through which users can access various information sources and services/applications. A portal may include several components including one or more portal pages. A portal page may comprise one or more portal snippets that enable data to be retrieved and displayed on the portal page. Portal snippets are generally programs that retrieve data from an information resource and display it on a portal page. Examples of portal snippets include portlets, SAP's iViews, Plumtree's gadgets, Microsoft's web parts, etc. Portals generally allow a user to select and customize portal snippets that are included in the user's portal page or pages. In this manner, the user can customize the content that is retrieved and displayed on the user's portal page.

Two characteristics are generally associated with a portal snippet: the content retrieved by the snippet and the manner in which the content is displayed on a portal page. With respect to the content that is retrieved, a portal snippet can be considered as an information query (or multiple queries) having one or more input parameters that is executed to retrieve information from one or more information sources. The parameters to the query and their values may be set by the portal administrator, the portal snippet designer/programmer, or some other user, or may be set by default. With respect to the presentation aspect, each portal snippet is typically allocated a location on a page or screen where the retrieved information is to be displayed.

When a user connects to and logs into a portal and views a portal page comprising a portal snippet, the portal snippet is automatically invoked. As a result of the invocation, the one or more parameterized queries corresponding to the portal snippet are executed to obtain the relevant information from one or more information resources. Examples of queries include a query accessing stock information, a query accessing weather information, a query to access company news, query to access a particular set of documents, etc. The retrieved information is then displayed on the section of the page allocated to the portal snippet.

Various computing frameworks and programming languages may be used to develop a portal snippet. For example, in a J2EE framework, a portal snippet might be developed using Java language, such as a Java code module or a Java class object. For purposes of this invention, a portal snippet programmed using Java for a Java-framework specification, such as J2EE, will be referred to as a "Java portal snippet" (sometimes also referred to as a "Java iView"). A Java portal snippet may use APIs and services provided by the J2EE Java-framework and may be developed in a Java Integrated Development Environment (Java IDE).

Portal snippets may also be developed in other frameworks such as the .NET framework from Microsoft Corporation. A portal snippet may be developed using a language supported by (or compatible with) the .NET framework such as C#, VB.NET, J#, C++, ASP.NET, Visual Basic, etc. For purposes of this invention, a portal snippet programmed using a .NET language will be referred to as a ".NET portal snippet" (sometimes also referred to as a ".NET iView"). A .NET portal snippet may use APIs and services provided by the NET framework and may be developed in a .NET Integrated Development Environment (.NET IDE) such as Visual Studio .NET from Microsoft Corporation.

According to an embodiment of the present invention, .NET portal snippets can be executed in a Java-framework (e.g., J2EE) based portal. For example, a .NET portal snippet can use services and objects provided by a SAP portal executing in a J2EE framework. According to an embodiment of the present invention, a .NET portal snippet might be written in a way similar to developing an ASP.NET page. In such an embodiment, a .NET portal snippet may comprise an ASP.NET page and its compiled code. In alternative embodiments, other formats may be used for developing a .NET portal snippet. A .NET portal snippet can use portal APIs and services that were developed in Java as though they were developed in .NET. .NET conventions of writing web pages can be used to write the portal snippets. .NET developers can easily develop portal snippets using their .NET skills. .NET and Windows components (e.g., COM objects) may be used to develop portal snippets. Embodiments of the present invention thus give users that are not Java developers the ability to develop portal snippets (content) for a Java-based Portal such as the SAP Portal.

According to an embodiment of the present invention, in order to facilitate development of .NET portal snippets that can be executed in a SAP J2EE Portal, a new object class— SAP.Portal.Web.UI.PortalComponent—is provided to the portal snippet designers. This new class derives from System.Web.UI.Page class. In this embodiment, a .NET portal snippet is like an ASP.NET page along with its associated compiled code. .NET iViews that can execute in a SAP Java-based portal environment inherit from the new object class. Portal-specific contextual objects such as profile (gives specific information of the instance of an iView), logger (logs problems in the Java or .NET portal server in one log), user information, theme information, etc. are made available through properties of the iView. All ASP.NET objects such as requests, responses, sessions, applications, etc. are available to iView developers. The implementation of .NET portal snippets is however not limited to using ASP.NET—various other techniques and formats may also be used to develop .NET portal snippets in alternative embodiments.

FIG. 1 is a simplified block diagram of a distributed network 100 comprising an enterprise portal 102 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, a client computer 104 is coupled to enterprise portal 102 via a communication network 106. Portal 102 provides a central gateway through which applications, such as browser 108 executing on client computer 104, can access various information and services/applications from information sources 110. Information sources 110 may include various applications (either internal or external to the enterprise portal) 112, documents 114, source from the Web 116, various databases 118, and other information sources 120. Client computer 104 may be a personal computer (PC), a PDA, a mobile phone, or any other computing device.

Communication network 106 may be a local area network (LAN), a wide area network (WAN), a wireless network, an Intranet, the Internet, a private network, a public network, a switched network, or any other suitable communication network. Communication network 106 may comprise many interconnected computer systems and communication links such as hardwire links, optical links, satellite or other wireless communications links, wave propagation links, or any other mechanisms for communication of information. Various communication protocols may be used to facilitate communication of information via communication network 106, including TCP/IP, HTTP protocols, extensible markup language (XML), wireless application protocol (WAP), protocols under development by industry standard organizations, vendor-specific protocols, customized protocols, and others.

As depicted in FIG. 1, the runtime environment for enterprise portal 102 includes a Java-framework compliant server such as J2EE portal server 122 depicted in FIG. 1 and a .NET portal server 124. J2EE portal server 122 is coupled to .NET portal server 124 via interoperability framework 126. The runtime environment may also include a unification server 128 and knowledge management (KM) 130.

According to an embodiment of the present invention, unification server 128 is configured to provide a business unification layer that enables dynamic integration of both applications and information from various sources. The business unification layer enables the creation of a unified object model, so that a portal user may dynamically integrate applications and information.

Knowledge management (KM) 130 is a set of services for managing knowledge and collaboration. KM 130 provides a framework to harmonize various business tools under one business management framework regardless of the physical location of data. In one implementation, KM 130 includes a repository framework that manages the content of documents and corresponding document attributes, classification engine that organizes contents in folder or tree structures, and other components for managing information.

J2EE portal server 122 is a component that is configured to provide portal services. According to an embodiment of the present invention, as depicted in FIG. 1, J2EE portal server 122 includes a web server 132, a repository 134, and a portal runtime (PRT) 136. Web server 132 is configured to facilitate transfer of data to and from J2EE portal server 122. For example, web server 132 receives portal snippet requests from client computers and communicates responses to the requests to the appropriate client computers. Web server 132 may also be configured to provide authentication services.

Repository 134 provides a persistent store for information and objects that are used for providing portal functionality. Repository 134 might store application objects, connector service objects, templates, portal snippets, portal roles information, portal pages, and the like. One example of such a repository is SAP's Portal Content Directory.

PRT 136 is an engine that is responsible for Portal specific behaviors, including responding to Java or .NET portal snippet requests. It provides a framework for creating, deploying, and running Java Portal Services, Java Portal Components, .NET Portal Components 138 and .NET Portal Service 140. It has some layers of abstraction of Portal objects. PRT 136 provides cache features that components could use for the processing. According to an embodiment of the present invention, PRT 136 may be implemented as a Java servlet that could be added to any Web Application Server (WAS). In alternative embodiments, the various services and components may be integrated as part of PRT 136. PRT 136 may also be integrated with J2EE server 122 in alternative embodiments.

.NET Portal Components 138 comprise code (logic) that is executed for portal snippets supported by portal 102. Based upon the portal snippet request received from a client computer, a particular .NET Portal Component may be selected and executed for the portal snippet. According to an embodiment of the present invention, a .NET Portal Component is a standard Java portal component that calls .NET Portal Service 140.

NET Portal Service 140 is configured to provide services for running portal snippets and servers that provide portal functionality. According to an embodiment of the present invention, .NET Portal Service 140 enables applications developed compliant to the .NET framework to use Java portal services. An application is considered compliant to the .NET framework if it is programmed using a .NET language and/or uses protocols and APIs provided by the .NET framework. Accordingly, .NET Portal Service 140 provides the ability to use Java portal services from a .NET environment. .NET Portal Service 140 also provides Java services that extend the functionality that a developer may use. For example, it may provide portal services such as system landscape, user management, look and feel, and others.

According to an embodiment of the present invention, .NET Portal Service 140 provides the ability to use Java portal services from a .NET portal snippet using interoperability framework 126. According to an embodiment of the present invention, .NET Portal Service 140 creates and exposes wrappers to proxies generated by interoperability framework 126. The wrappers contain code that optimizes communication and other operations performed by J2EE portal server 122 and .NET portal server 124. Various techniques such as caching, batch calls, minimizing information trips between J2EE portal server 122 and .NET portal server 124, etc. are used to achieve the optimization.

.NET Portal Service 140 might contain Java code that enables communication with .NET portal server 124. In one embodiment, .NET Portal Service 140 is a standard Java portal service that includes the necessary logic for enabling communications between J2EE portal server 122 and .NET portal server 124. The .NET portal snippets also use services provided by interoperability framework 126. As a result, the core code of the portal runtime does not need to be changed in order to provide support for running .NET portal snippets.

.NET portal server 124 is configured to perform processing for supporting .NET portal snippets. According to an embodiment of the present invention, .NET portal server 124 includes .NET Framework code 142. In embodiments where a .NET portal snippet is implemented using ASP.NET pages, .NET Framework code 142 may include ASP.NET code comprising ASP pages that are executed responsive to receiving .NET portal snippet requests. Accordingly, an IIS server is not used for execution of .NET portal snippets—instead, an ASP.NET networking process is used. ASP.NET objects such as requests, responses, sessions, applications, etc. are available to portal snippet (iView) developers. In alternative embodiments, .NET Framework code 142 may include other types of code that is to facilitate execution of .NET portal snippets.

According to an embodiment of the present invention, different application domains may be used for executing the portal snippets. For example, in one embodiment, one application domain may be used for all the portal snippets. In another embodiment, the portal snippets may be separated into separate applications. Pool of application domains may be used. Application domains provide a secure and versatile unit of processing that the common language runtime can use to provide isolation between applications. Several application domains can be run in a single process with the same level of isolation that would exist in separate processes, but without incurring the additional overhead of making cross-process calls or switching between processes.

A monitoring process may be used to monitor .NET portal server 124. The .NET Portal server may also run as a NT service, leveraging all the features of a NT service, including automatic recovering after failure.

Interoperability framework 126 provides a mechanism that enables communication of information between .NET portal server 124 and J2EE portal server 122. Interoperability framework 126 allows API calls from J2EE portal server 122 (also referred to as the Java stack) to .NET portal server 124 (also referred to as the .NET stack) and vice versa. Objects (including components and services) can be passed by reference or by value between J2EE portal server 122 and .NET portal server 124 depending on the context of use. According to an embodiment of the present invention, for each .NET object that can be called from the Java stack, a Java proxy object is created, and vice versa. Interoperability framework 126 may use .NET remoting technology on the .NET side. The transport channel used by interoperability framework 126 may be optimized for one or more machines. The transport channel could be implemented as HTTP, TCP, Shared memory, etc.

According to an embodiment of the present invention, interoperability framework 126 may be implemented using third party products such as the Ja.NET product from Intrinsyc Software headquartered in British Columbia, Canada. Ja.NET provides a bridge between the Java/J2EE world and the .NET world. Ja.NET provides a framework that allows data to be exchanged between Java applications executing in a Java-framework (e.g., J2EE) and applications executing in a .NET framework. Using Ja.NET, .NET applications can access Java/J2EE applications as though they were .NET applications. Likewise, using Ja.NET, Java and J2EE application can access .NET components as though the .NET components were written in Java.

Ja.NET leverages .NET remoting which is Microsoft's distributed objects communication protocol. .NET remoting provides services for communicating data between .NET applications and components executing in a distributed environment. .NET remoting is used within .NET to enable common language runtime (CLR) components in different application domains to talk to each other. Java components are exposed as CLR components and CLR components are exposed as Java components.

According to an embodiment of the present invention, in order for Java code to call .NET code and vice versa, Ja.NET proxies are used. These proxies might be generated during compile time and represent objects corresponding to objects in the opposite stack (i.e., within the .NET stack or Java stack). During runtime, a proxy object is used as any other local object, from the caller's perspective.

Figure 2:
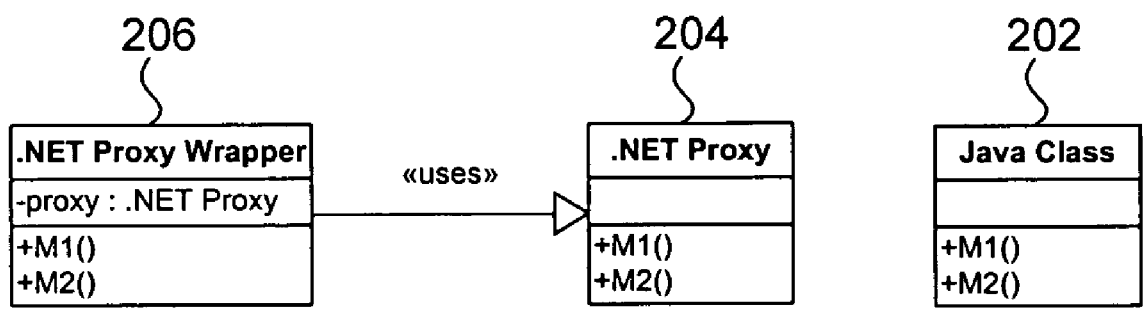
FIG. 2 depicts a .NET proxy object created for a Java class and a wrapper created for the .NET proxy object according to an embodiment of the present invention.

According to an embodiment of the present invention, Java classes are exposed to .NET designers. Using Ja.NET, a .NET proxy object is created for each Java class that can be called from .NET. A .NET wrapper class is created for each proxy class. As depicted in FIG. 2, a .NET proxy object 204 is created for a Java class 202. A wrapper 206 is created for .NET proxy object 204. Since it is a wrapper, its interface might be different from the proxy. For example, it might have only one method m3( ) that internally uses methods m1( ) and m2( ) depicted in FIG. 2.

Proxies may be divided into two types: (1) By Value; and (2) By Reference. Communicating a proxy object by value implies that when a proxy of a particular object on a first server is sent to a second server, the proxy already contains all the data of the particular object on the first server. The data is serialized and when it is used by the second server, no round trips are needed to the first server or local server.

A reference type proxy object means that the proxy contains only references (pointers) to the object on the original provider server. Accordingly, when a proxy is communicated by reference from a provider server to a consumer server, only a reference to the object is passed. When a method on the object is called on the consumer server, the code that is executed actually runs on the provider server.

According to an embodiment of the present invention, during runtime, invocation of a method on a Java object from .NET results in the following processing:

(1) No object (the proxy or the object on the Java side) is created until a method is called.

(2) A wrapper object is created using the "new" method. Processing may be optimized by caching the wrapper object for later calls.

(3) After a first method is called on the wrapper object, the proxy object is created and the Java object is created (by the interoperability framework). The (.NET) proxy object holds a "reference" to the Java object.

(4) The method call is delegated to the proxy object and via the interoperability framework to the Java object.

(5) The return value from the Java object is returned through the proxy and the wrapper.

In case where the Java object is a singleton, step 3 might be different in that the (.NET) proxy object gets a 'reference' to an exiting Java object. A symmetrical flow happens when calling from Java to .NET.

Figure 3:
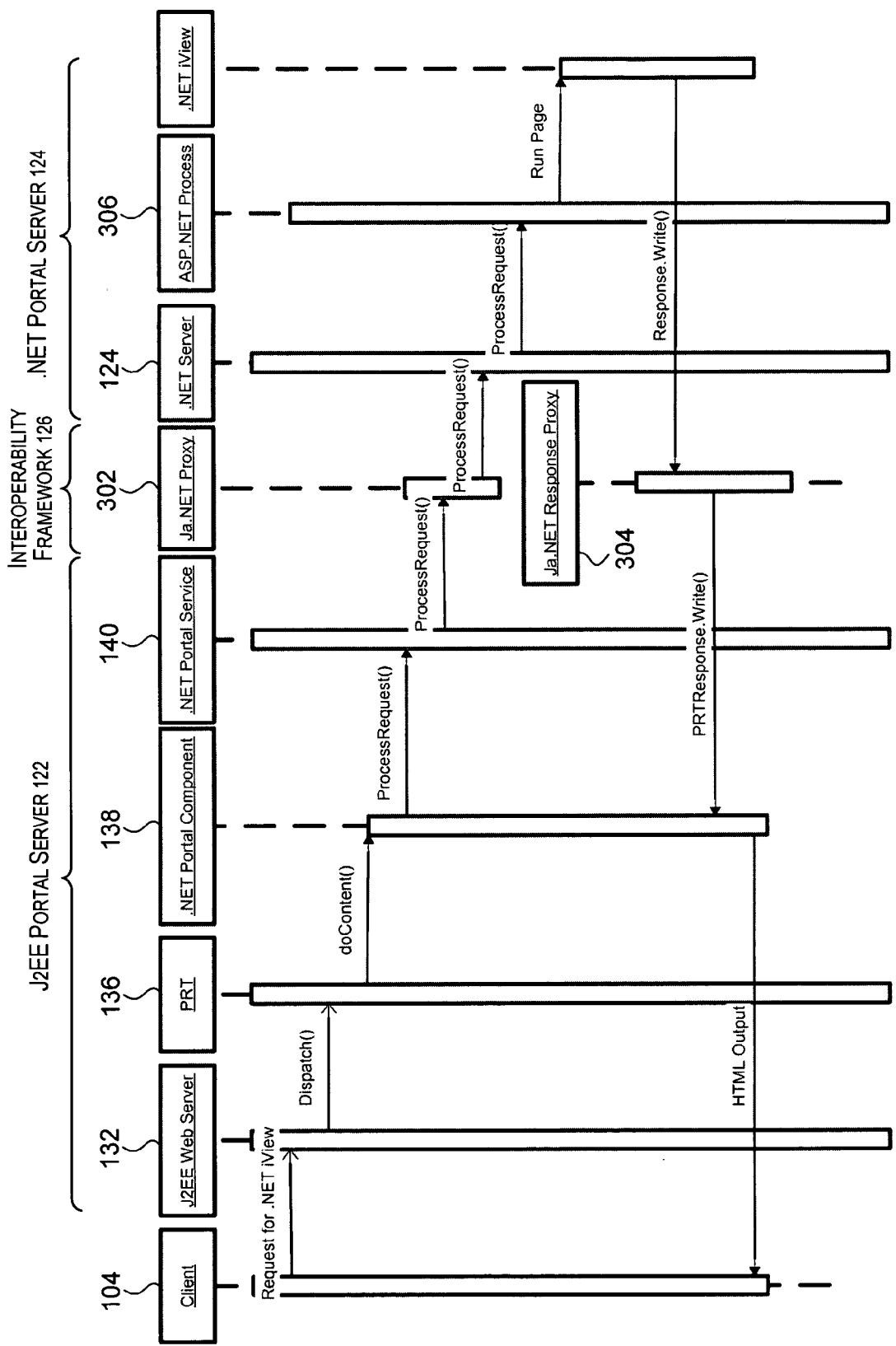
FIG. 3 depicts a simplified high level information flow between various components of a portal for processing .NET portal snippet requests according to an embodiment of the present invention.

FIG. 3 depicts a simplified high level information flow between various components of a portal for processing .NET portal snippet requests according to an embodiment of the present invention. FIG. 3 is merely illustrative of an embodiment incorporating the present invention and does not limit the scope of the invention as recited in the claims. One of ordinary skill in the art would recognize other variations, modifications, and alternatives.

As shown, processing is initiated when a request for a .NET portal snippet is received by J2EE portal server 122 from a client computer 104. In one embodiment, the .NET portal snippet request may be automatically generated at client computer 104 when a user views a page comprising the portal snippet using a browser executing on client computer 104. The generated .NET portal snippet request is then communicated from client computer 104 to J2EE portal server 122.

On the J2EE server side, the .NET portal snippet request might be received by web server 132. Web server 132 may then perform user authentication operations. Upon successful authentication, web server 132 may forward the .NET portal snippet request to PRT 136.

The .NET portal snippet request that is received comprises information that identifies a specific portal snippet (or iView). PRT 136 uses that information o identify a .NET Portal Component 138 that contains code that is responsible for execution of the requested portal snippet. If the .NET portal snippet is part of a page, the page might be responsible for launching the appropriate .NET Portal Component 138. .NET Portal Component is a standard Java portal component that calls .NET Portal Service 140. In one embodiment, .NET Portal Service 140 is a standard Java portal service that includes the necessary logic for enabling communications between J2EE portal server 122 and .NET portal server 124.

.NET Portal Service 140 collects the necessary information from J2EE portal server 122 using Java API calls. One or more additional Ja.NET proxy objects may be created that contain the data for the request, for example, Request, User-Context, Headers, etc. and passed to .NET portal server 124. The objects may be passed by reference or by value.

.NET Portal Service 140 uses interoperability framework 126 to facilitate communications between J2EE portal server 122 and .NET portal server 124. As described above, in one embodiment, Ja.NET may be used to implement interoperability framework 126. In this embodiment, .NET Portal Service 140 uses a Ja.NET proxy 302 of the public .NET object of .NET portal server 124. This proxy is a Java Class that has the same signature as the entry-point object of .NET portal server 124.

Ja.NET proxies use Ja.NET mechanism to pass the .NET portal snippet request from J2EE portal server 122 to .NET portal server 124. In one embodiment, the mechanism uses a TCP server. Other types of communication channels may also be used. A Response Proxy object 304 is also created and passed to .NET portal server 124 as part of the mechanism. As described below, Response Proxy object 304 is used for returning the results of the request from .NET portal server 124 to J2EE portal server 122.

Upon receiving the .NET portal snippet request, .NET portal server 124 determines a specific .NET framework code to be executed based upon information contained in the .NET portal snippet request. In embodiments where the .NET portal snippet is implemented as an ASP.NET page, an ASP.NET code page is determined to be executed. A .NET framework API is used to run the selected ASP.NET page. According to the teachings of the present invention, an IIS server is not needed for running the ASP.NET page, instead an ASP.NET Process 306 is used.

According to an embodiment of the present invention, since the .NET code of the .NET portal snippet is kept in the portal (Java) repository, when the .NET Portal server is requested to run the code it is retrieved from the Java Portal. When the .NET Portal server identifies that it does not have the updated code, it asks the Java Portal server (via the interoperability framework for the portal snippet's code). An additional mechanism is used to update the .NET Portal server on any update of the portal snippet's code in the Portal repository.

After the ASP.NET page (or other code) selected for the .NET portal snippet has completed execution, the results of the execution (i.e., the response to the .NET portal snippet request) are returned by .NET portal server 124 to .NET Portal Service 140 of J2EE portal server 122 using Response Proxy object 304 that was sent earlier. The response may include HTML and headers. Interoperability framework 126 is used to facilitate communication of the response from .NET portal server 124 to J2EE portal server 122. According to an embodiment of the present invention, Ja.Net is used for the communication. The response proxy then dispatches the response data to the corresponding PRT APIs.

PRT 136 may add additional information to the response received via .NET Portal Service 140. The additional information may include data relevant to the .NET portal snippet such as JScripts, cascading style sheets (CSS) files, etc. The response is then communicated to client computer 104 via web server 132. Content received in the .NET portal snippet response may then be displayed in a location allocated to the .NET portal snippet on a page viewed by the user.

In certain instances, the .NET portal snippet request received by J2EE portal server 122 may also contain calls to portal services such as System landscape, User management, look & feel, etc. In this instance, additional processing steps may be performed in addition to the processing described above for FIG. 3. When .NET portal server 124 processes such a request and runs the appropriate ASP.NET page (or appropriate .NET framework code), it may use Ja.NET proxies that represent Java objects. These proxies may be reference proxies and thus any call to these proxies is executed on J2EE portal server 122 using J2EE server .NET mechanism. The code (logic) runs on the Java portal server using standard portal services and the results of the methods are returned to .NET portal server 124. The client code runs on a .NET platform.

If the request received by J2EE portal server 122 is for a Java portal snippet, then processing to satisfy the request is performed by J2EE portal server 122 and .NET portal server 124 is not used.

Figure 4A:
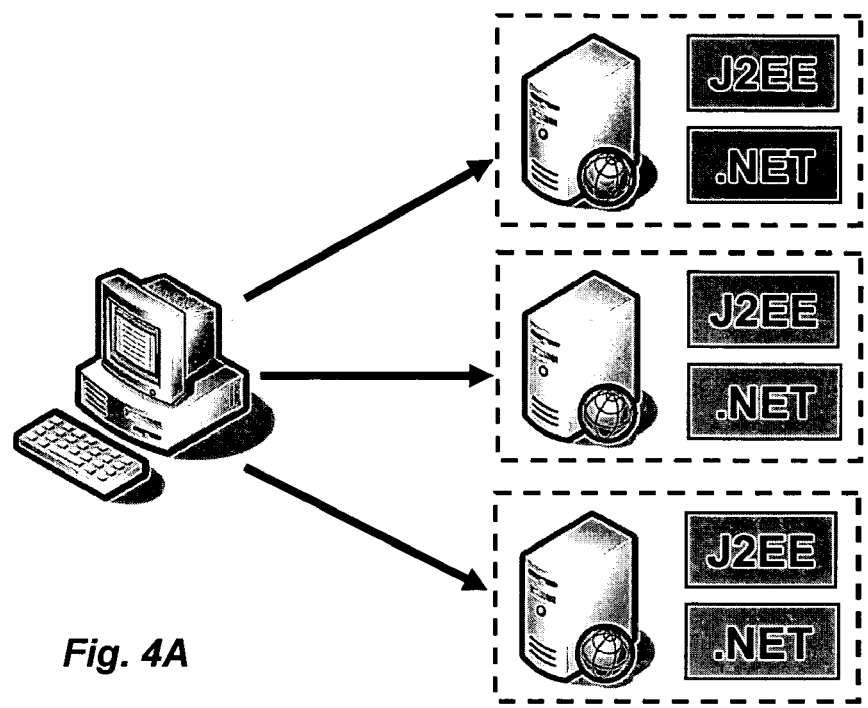
FIGS. 4A, 4B, 4C, 4D, 4E, and 4F show examples of deployment models according to embodiments of the present invention.

Various deployment models may be used to deploy the J2EE and .NET portal servers. FIGS. 4A, 4B, 4C, 4D, 4E, and 4F show examples of deployment models that may be used. As shown in FIG. 4A, a J2EE portal server and .NET portal server may reside on the same physical machine, such as a MS Windows machine. Each server may have its own repository and configuration.

Figure 4B:
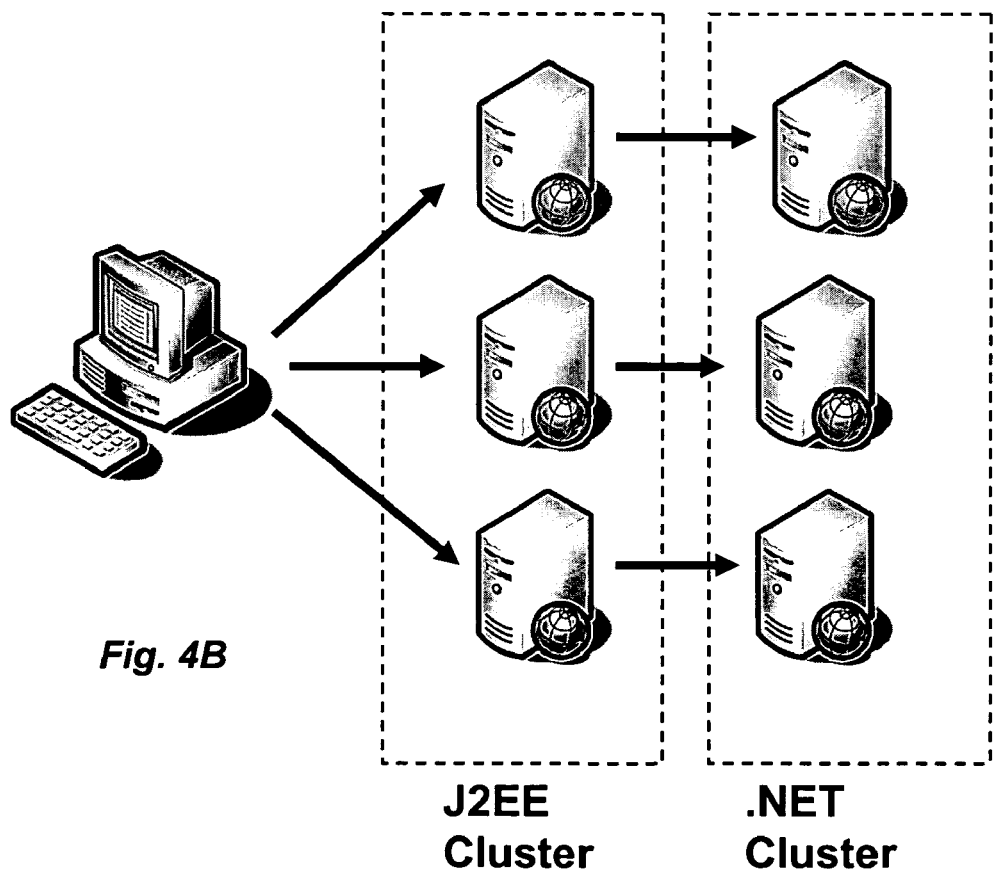

In FIG. 4B, a J2EE portal server and a .NET portal server are installed on different machines. The J2EE portal servers may be installed on a UNIX machine and the .NET portal servers may be installed on a Windows machine. The set of machines on which J2EE portal servers are installed may form a J2EE portal cluster. The set of machines on which .NET portal servers are installed may form a .NET portal cluster.

As shown in FIGS. 4A and 4B, each J2EE portal server may be configured to work with a particular .NET portal server. According to an embodiment of the present invention, servers of different versions may be deployed at the same time. In such an embodiment, a particular version of J2EE portal server may be configured to work with a particular version of .NET portal server.

Figure 4C:
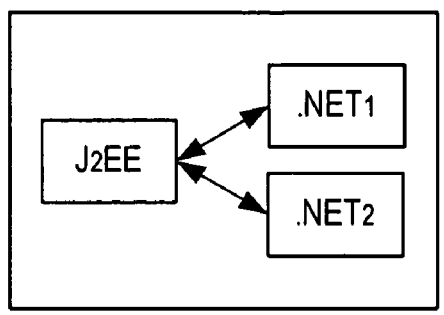
Figure 4D:
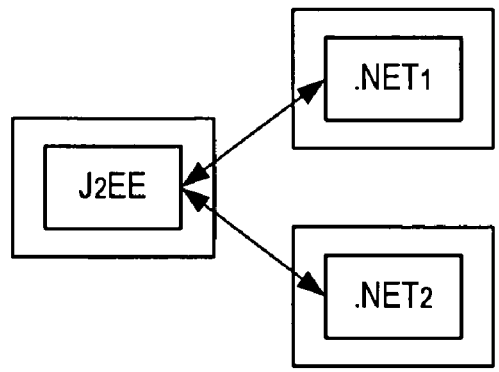

Multiple J2EE portal servers and .NET portal servers may also be used. As depicted in FIGS. 4C and 4D, a single J2EE portal server may work with two .NET portal servers (.NET1 and .NET2). In FIG. 4C, the J2EE portal server and the two .NET portal servers are installed on the same machine. In FIG. 4D, the servers are installed on different machines. According to an embodiment of the present invention, a dispatcher may be installed on the J2EE portal server to implement the model depicted in FIGS. 4C and 4D. The dispatcher may be configured to determine a .NET portal server to use from the available .NET portal servers. The dispatcher may prevent marshalling between application domains on the .NET side.

According to an embodiment of the present invention, using the models shown in FIGS. 4C and 4D, different portal snippets may be deployed to different .NET portal servers based upon logic associated with the portal snippets. For example, test portal snippets may be run on a "development".NET portal server (e.g., .NET1) and released portal snippets may be run on a "production".NET portal server (e.g., .NET2).

Figure 4E:
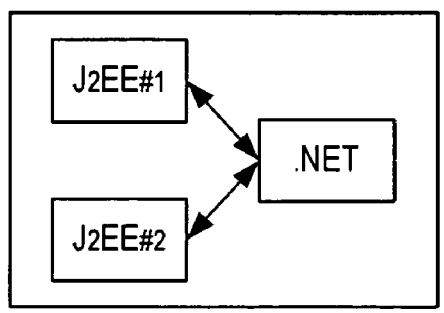
Figure 4F:
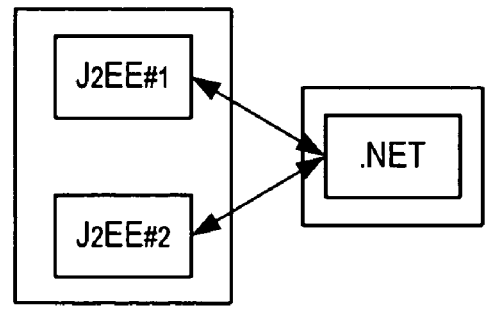

Several J2EE portal server instances may work with the same .NET portal server as shown in FIGS. 4E and 4F. The J2EE portal server instances may use the same repository but with different configurations. In FIG. 4E, the two J2EE portal servers (J2EE#1 and J2EE#2) and the .NET portal servers are installed on the same machine. In FIG. 4F, the J2EE portal servers are installed on one machine and the .NET portal server is installed on a different machine.

As described above, embodiments of the present invention provide a portal architecture that is capable of running both Java portal snippets and .NET portal snippets in an integrated manner. J2EE portal server 122 provides a common point for receiving both Java portal snippets requests and .NET portal snippet requests. Accordingly, from the viewpoint of the browser application, J2EE portal server 122 acts a central point for accessing portal services. .NET portal snippet requests are processed by J2EE portal server 122 and .NET portal server 124 working in conjunction. Execution of .NET portal snippet requests does not require the use of an IIS server or any other server external to the portal.

Embodiments of the present invention thus allow portal snippets developed in a .NET language to run within a Java-based portal such as the SAP Portal. .NET portal snippets can use portal APIs and services that were developed in Java as though they were developed in .NET. .NET conventions and languages (e.g., C#, C++, Visual Basic, ASP.NET, VB.NET, J#, etc.) of writing web pages can be used to write portal snippets. .NET developers can easily develop portal snippets using their .NET skills. .NET and Windows components (e.g., COM objects) may be used to develop portal snippets. Embodiments of the present invention thus give users that are not Java developers the ability to develop portal snippets (content) for a Java-based Portal such as the SAP Portal.

Accordingly, embodiments of the present invention enable portal snippets developed using a language supported by a first framework to be executed in a portal based upon a second framework that is different from the first framework. The portal is able to execute portal snippets developed using languages from different frameworks in an integrated manner.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

Code is stored on a computer readable medium.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method executed by a portal, the method comprising:
receiving, at a first portal server executing according to a Java™-based framework, a request from a first computer identifying a portal snippet that is developed using a first language supported by a .NET framework different from the Java™-based framework, wherein the .NET framework is associated with the first language, wherein the Java™-based framework is associated with a second language, and wherein the first language is different than the second language; communicating the request from the first portal server to a second portal server that is configured to process portal snippets configured using a language supported by the .NET framework, wherein communicating comprises:
creating wrappers that comprise code to optimize communication between the Java™-based framework and the .NET framework, and wherein optimization comprises minimizing information trips between the Java™-based framework and the .NET framework;
communicating a first object from the first portal server to the second portal server, said communicating the first object comprises passing the first object by value;
generating a response to the request, using the first object, at the second portal server;
communicating the response from the second portal server to the first portal server; and
communicating the response from the first portal server to the first computer.

2. The method of claim 1 wherein the Java™-based framework is Java™ 2 Platform Enterprise Edition (J2EE™) framework.

3. The method of claim 1 wherein communicating the first object also comprises passing the first object by reference.

4. The method of claim 3 wherein using the first object comprises executing a code module on the first portal server.

5. The method of claim 4 wherein the code module is a Java™ language code module.

6. The method of claim 1 wherein the first language is at least one of C#, C++, Visual Basic™, and ASP.NET.

7. The method of claim 1 wherein generating the response to the request comprises executing an ASP.NET page at the second portal server.

8. The method of claim 1 wherein the first portal server and second portal server are installed on a second computer system.

9. The method of claim 1 wherein the first portal server is installed on a second computer system and the second portal server is installed on a third computer system different from the second computer system.

10. A method of providing portal functionality, the method comprising:

providing a first portal server configured to process portal snippets developed using a first language supported by a Java™-based framework;

providing a second portal server configured to process portal snippets developed using a second language supported by a .NET framework wherein the Java™-based framework is associated with the first language, wherein the .NET framework is associated with a second language, and wherein the first language is different than the second language;

receiving, at the first portal server, a request from a first computer identifying a portal snippet that is developed using the second language;

communicating the request from the first portal server to the second portal server, wherein communicating comprises:

creating wrappers that comprise code to optimize communication between the Java™-based framework and the .NET framework, and wherein optimization comprises minimizing information trips between the first Java™-based framework and the .NET framework;

communicating a first object from the first portal server to the second portal server, said communicating the first object comprises passing the first object by value;

generating a response to the request, using the first object, at the second portal server; and communicating the response to the first computer via the first portal server.

11. The method of claim 10 wherein the Java™-based framework is Java™ 2 Platform Enterprise Edition (J2EE™) framework.

12. The method of claim 10 wherein the first language is Java™ and the second language is at least one of C#, C++, Visual Basic™, and ASP.NET.

13. A computer program product stored on a computer-readable medium for providing portal functionality, the computer program product comprising:

code for receiving, at a first portal server executing according to a Java™-based framework, a request from a first computer identifying a portal snippet that is developed using a first language supported by a .NET framework different from the Java™-based framework, wherein the .NET framework is associated with the first language, wherein the Java™-based framework is associated with a second language, and wherein the first language is different than the second language;

code for communicating the request from the first portal server to a second portal server that is configured to process portal snippets configured using a language supported by the .NET framework, wherein communicating comprises creating wrappers that comprise code to optimize communication between the Java™-based framework and the .NET framework, and wherein optimization comprises minimizing information trips between the Java™-based framework and the .NET framework;

code for communicating a first object from the first portal server to the second portal server, said communicating the first object comprises passing the first object by value;

code for generating a response to the request, using the first object, at the second portal server;

code for communicating the response from the second portal server to the first portal server; and code for communicating the response from the first portal server to the first computer.

14. The computer program product of claim 13 wherein the Java™-based framework is Java™ 2 Platform Enterprise Edition (J2EE™) framework.

15. The computer program product of claim 14 wherein the code for using the first object comprises code for executing a code module on the first portal server.

16. The computer program product of claim 13 wherein the code for generating the response to the request comprises code for executing an ASP.NET page at the second portal server.

17. A computer program product stored on a computer-readable medium for providing portal functionality, the computer program product comprising:

code for providing a first portal server configured to process portal snippets developed using a first language supported by a first Java™-based framework;

code for providing a second portal server configured to process portal snippets developed using a second language supported by a .NET framework, wherein the Java™-based framework is associated with the first language, wherein the .NET framework is associated with a second language, and wherein the first language is different than the second language;

code for receiving, at the first portal server, a request from a first computer identifying a portal snippet that is developed using the second language;

code for communicating the request from the first portal server to the second portal server, wherein communicating comprises creating wrappers that comprise code to optimize communication between the Java™-based framework and the .NET framework, and wherein optimization comprises minimizing information trips between the Java™-based framework and the .NET framework;

code for communicating a first object from the first portal server to the second portal server, said communicating the first object comprises including passing the first object by value;

code for generating a response to the request, using the first object, at the second portal server; and code for communicating the response to the first computer via the first portal server.

18. The computer program product of claim 17 wherein the first framework is Java™ 2 Platform Enterprise Edition (J2EE™) framework.

19. The computer program product of claim 17 wherein the first language is Java™ and the second language is at least one of C#, C++, Visual Basic™, and ASP.NET.

20. A data processing system comprising:

a processor;

a memory coupled to the processor, the memory configured to store a plurality of code modules which when executed by the processor cause the processor to:

execute a first portal server configured to process portal snippets developed using a first language supported by a Java™-based framework;

execute a second portal server configured to process portal snippets developed using a second language supported by a .NET framework, wherein the Java™-based framework is associated with the first language, wherein the .NET framework is associated with a second language, and wherein the first language is different than the second language;

receive, at the first portal server, a request from a first computer identifying a portal snippet that is developed using the second language;

communicate the request from the first portal server to the second portal server, wherein communicating comprises creating wrappers that comprise code to optimize communication between the Java™-based framework and the .NET framework, and wherein optimization comprises minimizing information trips between the Java™-based framework and the .NET framework;

communicate a first object from the first portal server to the second portal server, wherein communicating the first object comprises passing the first object by value;

generate a response to the request, using the first object, at the second portal server; and communicate the response to the first computer via the first portal server.

21. A portal comprising:

a first data processing system executing a first portal server configured to process portal snippets developed using a first language supported by a Java™-based framework; and a second data processing system executing a second portal server configured to process portal snippets developed using a second language supported by a .NET framework wherein the Java™-based framework is associated with the first language, wherein the .NET framework is associated with a second language, and wherein the first language is different than the second language;

wherein the first data processing system receiving a request from a first computer identifying a portal snippet that is developed using the second language;

wherein the first data processing system communicating the request from the first portal server to the second portal server executing on the second data processing system, wherein communicating comprises creating wrappers that comprise code to optimize communication between the Java™-based framework and the .NET framework, and wherein optimization comprises minimizing information trips between the Java™-based framework and the .NET framework;

wherein the first data processing system communicating a first object from the first portal server to the second portal server, said communicating the first object comprises passing the first object by value;

wherein the second data processing system generating a response to the request, using the first object, and communicating the response to the first data processing system; and wherein the first data processing system communicating the response to the first computer.

* * * * *